United States Patent [19]

Allen

[11] Patent Number: 5,116,008

[45] Date of Patent: May 26, 1992

[54] ADJUSTABLE SUPPORT ASSEMBLY

[75] Inventor: R. Dan Allen, Newbury, Ohio

[73] Assignee: Edgewater Medical Equipment Systems, Inc., Bedford Heights, Ohio

[21] Appl. No.: 679,622

[22] Filed: Apr. 3, 1991

[51] Int. Cl.⁵ .............................................. F04G 3/00
[52] U.S. Cl. .................... 248/286; 248/229; 269/78
[58] Field of Search .............. 248/286, 284, 291, 298, 248/229, 915; 269/77, 78; 403/59, 385, 391, 396

[56] References Cited

U.S. PATENT DOCUMENTS

| | | | |
|---|---|---|---|
| 2,767,003 | 10/1956 | Gilmont | 403/385 |
| 3,881,888 | 5/1975 | Schwab | 269/78 X |
| 3,937,451 | 2/1976 | DiPaola et al. | 269/78 X |
| 4,564,164 | 1/1986 | Allen et al. | 248/118 |
| 4,747,569 | 5/1988 | Hoshino | 248/286 |
| 4,796,846 | 9/1989 | Meier et al. | 248/286 |
| 4,917,343 | 4/1990 | Wainscott | 248/284 X |

Primary Examiner—Ramon O. Ramirez
Attorney, Agent, or Firm—Pearne, Gordon, McCoy & Granger

[57] ABSTRACT

An adjustable clamping assembly is disclosed that includes first and second blocks each having a passageway through which support rods are inserted. The blocks may be rotated relative to each other. In one embodiment, each block has a slot extending from one face of each block to the passageway housing the support rod. The second block includes a frusto-conical seat for receiving a frusto-conical bearing member of the first block. A partially threaded stem extends from the first block coaxial with the bearing member and is inserted through an aperture in the second block. The stem is inserted within the tapped portion of a handle for adjusting the tightness of the assembly. As the handle is tightened the slots compress thereby securing the support rods in a fixed position within the passageways. In another embodiment, the first block includes a set screw instead of the slot for securing the support rod in a fixed position. The support rod has a flat portion so that when the set screw is adjusted away from the rod it may rotate about its longitudinal axis. A bushing may be provided in the passageway of the first block to facilitate rotation of the rod. In yet another embodiment, the first block includes a recess for receiving one end of the support rod so the rod is substantially parallel with the stem of the first block. A set screw is provided to secure the rod within the recess.

19 Claims, 3 Drawing Sheets

ADJUSTABLE SUPPORT ASSEMBLY

BACKGROUND OF THE INVENTION

1. Field of the Invention

This invention relates in general to an adjustable support assembly, and in particular to a assembly having at least two degrees of freedom in which one handle will lock the assembly in a desired position.

2. Description of the Prior Art

The present invention is directed toward improvements to the support system disclosed in a patent commonly owned by the applicant, i.e., U.S. Pat. No. 4,564,164, issued to Allen et al. on Jan. 14, 1986. Allen et al. discloses an adjustable support system having three degrees of freedom that can be locked in a desired position by one handle. Allen et al. is herein incorporated by reference.

The support system of Allen et al. relies upon a compression head to adequately secure the first and second blocks together when the handle is tightened. It has been discovered that frequently the forces exerted by a patient's limb being supported by the system of Allen et al. are sufficient to overcome the coefficient of friction created between the first and second blocks thereby causing them to rotate relative to each other. This relative movement will vary in its severity depending upon the forces created by the limb being supported. Discomfort or further injury may result to the patient when such movement occurs.

When the threaded member supporting the compression head of Allen et al. is withdrawn slightly from the blocks, the slots expand and both rods can be moved to the desired position relative to the blocks. Also, in this position the blocks can be rotated relative to each other. Sometimes it is desirable to restrict the relative rotation of the blocks while adjusting the rods. Allen et al. does not provide this feature.

Also, certain situations make it desirable to retain one of the support rods in a fixed position when adjusting the other rod. Allen et al. requires that both rods be loosened even if only one needs adjusted. Consequently, when adjusting one rod the other may inadvertently move. Allen et al. does not provide for maintaining one of the rods in a fixed position while adjusting the other.

The device of Allen et al. is employed advantageously because of its simplistic construction and the flexibility it provides for supporting a patient's limb, or various other structures. Thus, it is desirable to retain these advantages while simultaneously assuring that any unintended relative rotation of the first and second blocks is substantially prevented. Providing the support system with means for maintaining one rod in a fixed position while adjusting the other rod is also beneficial.

SUMMARY OF THE INVENTION

Accordingly, it is one object of the present invention to provide a support assembly with means for binding a first block with a second block when the support assembly is in its tightened position so that the relative rotation of the blocks is prevented. This means also restricts the relative rotation of the blocks when support assembly is loosened sufficiently to adjust the support rods relative to the blocks.

Another object of the present invention is to provide a support assembly having means for maintaining one rod in a fixed position while adjusting the other rod.

A preferred embodiment of the present invention includes first and second blocks. The first block includes means for retaining a first rod and means for securing the first rod within the first block. A partially threaded stem extends from the first block and is inserted through an aperture of the second block. The stem cooperates with a handle for adjusting the axial relationship of the first block to the second block. The second block includes a passageway therethrough for retaining a second support rod. A slot extends from the passageway to one face of the second block. When the first and second blocks are axially drawn toward one another, the slot in the second block is compressed sufficiently to secure the second rod within the passageway.

The means for binding the first block with the second block includes a frusto-conical seat integral with the second block and a frusto-conical bearing member integral with the first block. When the first and second blocks are joined together the frusto-conical bearing member resides within the frusto-conical seat.

The interaction of the frusto-conical seat and bearing member establishes a sufficiently high coefficient of friction to bind the blocks together and prevent their relative rotation. Consequently, the torque required to overcome the coefficient of friction is sufficiently great to prevent the unintended relative rotation of the blocks when the handle is tightened. The relative rotation of the blocks is also prevented when the handle is loosened enough to adjust the rods. Preventing the unintended relative rotation of the blocks reduces the likelihood that a patient will sustain further injury from accidental movement of the blocks, and provides the user greater control over the adjustments of the support assembly.

The handle of the present invention is substantially L-shaped for easy manipulation by the user. One end of the handle is internally threaded for receiving the stem after being inserted through the aperture of the second block. As the handle is tightened the stem is drawn further within the handle and consequently the first block and second block are drawn toward one another. As the blocks are drawn closer together the bearing member is drawn within the seat and the slot within the second block begins to be compressed. Further tightening of the handle compresses the slot sufficiently so that the second support rod is held in a fixed position within the passageway of the second block.

Loosening the handle allows the slot to expand so that the second rod may be moved within the passageway. Further loosening of the handle will free up the frusto-conical seat and bearing member so the blocks may be rotated relative to each other. A set screw is provided within the handle that can be tightened against a non-threaded portion of the stem to secure the support assembly in a desired position.

One embodiment of the present invention provides a passageway in the first block for retaining a first support rod. The first block contains a slot that extends from one face of the block to the passageway. When the handle is tightened in the aforementioned manner the slot compresses and the first rod is secured within the first block. When the handle is sufficiently loosened, the first and second rods may be adjusted while the frusto-conical seat and bearing member prevent the relative rotation of the first and second blocks. Additional loosening of the handle will allow the blocks to be rotated relative to each other.

Another embodiment of the present invention provides a set screw for securing the first rod in a fixed position rather than utilizing the slot as described above. The passageway of this embodiment includes a bushing within which the first support rod is inserted. The bushing facilitates longitudinal rotation of the support rod. The first rod includes a flat portion against which one end of the set screw is tightened to secure the rod in place if desired. Alternatively, the set screw may be adjusted away from the flat portion so that the rod may rotate aobut its longitudinal axis. The degree of rotation is restricted by the position of the set screw. If desired, the bushing may be removed and the first rod may be held in place by the set screw. With the bushing removed, the first rod is not intended to be rotated within the passageway but rather the set screw holds the rod in position.

Yet another embodiment of the present invention provides a recess within the first block into which one end of the first rod is inserted so it is substantially coaxial with the stem of the first block. A set screw is provided to secure the rod within the recess. This embodiment allows the assembly to be attached to a table so that the first rod is not adjustable.

The present invention has a significant advantage over the prior art by providing the frusto-conical seat and bearing member that substantially prevent unintentional relative rotation of the first and second blocks. Also, the present invention provides several embodiments for independently adjusting one rod while the other rod is held tightly in place.

DETAILED DESCRIPTION OF THE PREFERRED EMBODIMENT

Figure 1:
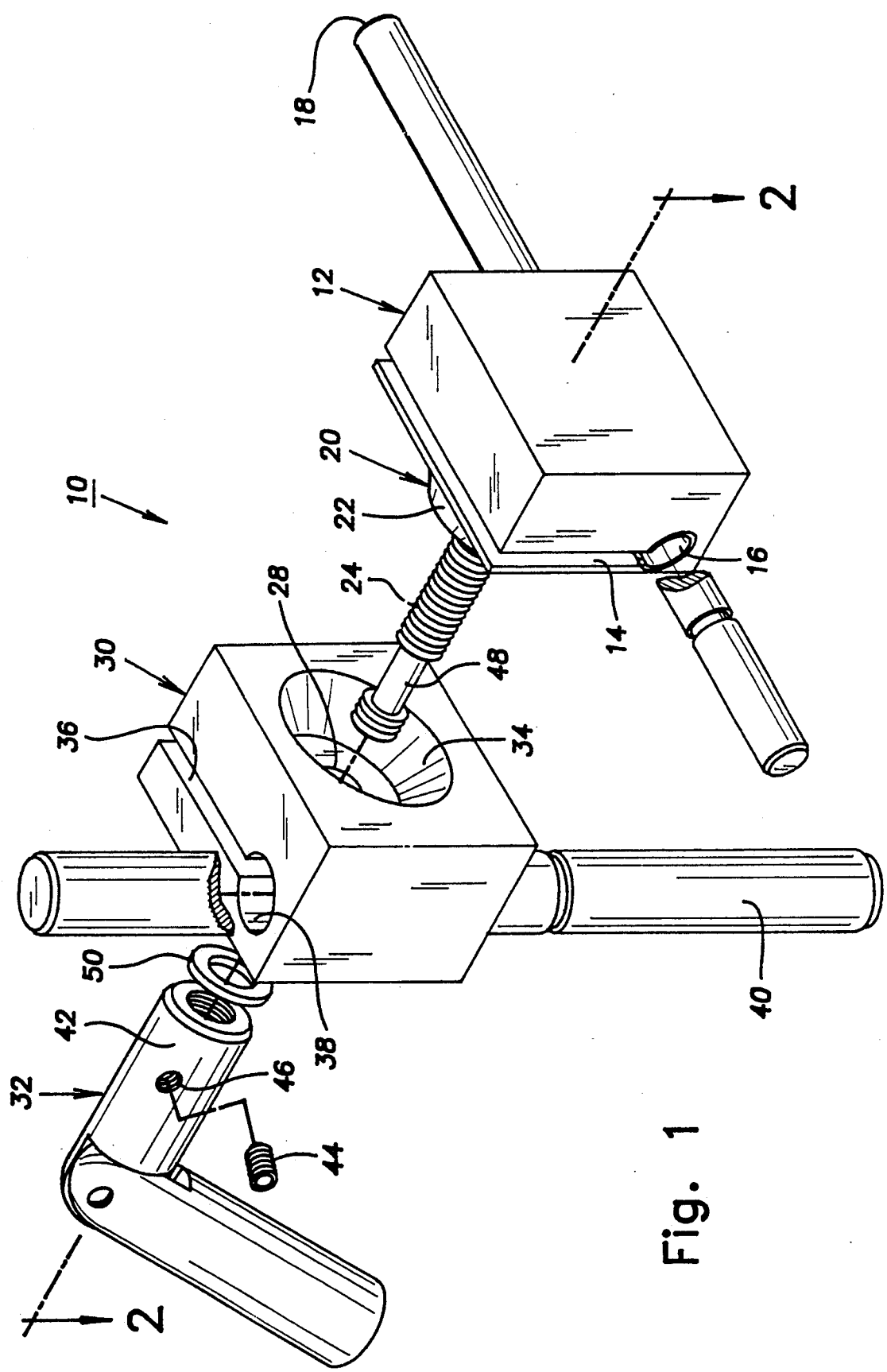
FIG. 1 is a perspective view of a preferred embodiment of the support assembly according to the present invention.

Referring now to the drawings, and in particular to FIG. 1, there is shown a preferred embodiment of the support assembly 10 according to the present invention. A first block 12 includes a first slot 14 that extends from one face of block 12 to a first cylindrical passageway 16 within the block 12. Slot 14 and passageway 16 extend completely through block 12. A first support rod 18 is inserted through passageway 16. Passageway 16 could alternatively be other suitable shapes depending upon the type of support rod being inserted therethrough. Also, slot 14 and passageway 16 may alternatively extend only partially through first block 12.

One means for retaining the first support rod 18 within the first block 12 comprises passageway 16. Alternatively, rod 18 may be retained by an external adjustable clamping assembly, for example. A means for securing the rod 18 within the first block 12 comprises first slot 14. When first slot 14 is sufficiently compressed rod 18 is secured within passageway 16.

A frusto-conical bearing member 20 is integral with one surface of block 12. The bearing surface 22 of bearing member 20 is preferably tapered between about 11.5° and 12.5°. A second block 30 includes a frusto-conical seat 34 that is also preferably tapered between about 11.5° and 12.5°. The interaction of bearing member 20 with seat 34 binds first block 12 with second block 30 so that relative rotation of the blocks 12, 30 is prevented. Alternately, the degree of taper of bearing member 20 and seat 30 may vary provided that blocks 12, 30 are prevented from rotating relative to each other solely by binding to one another.

Figure 2:
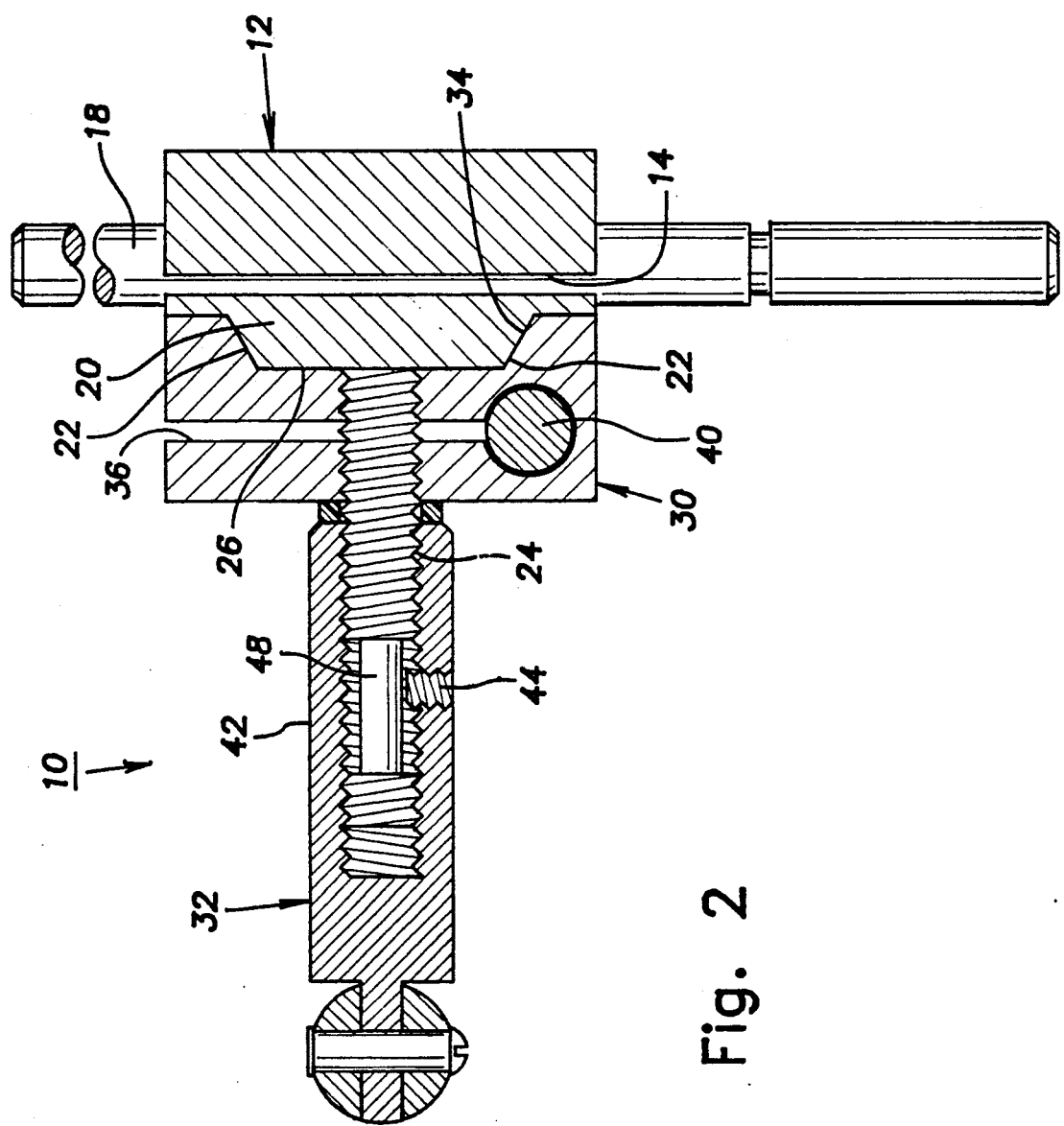
FIG. 2 is a sectional view taken along line 2—2 of FIG. 1.

A partially threaded stem 24 extends substantially perpendicularly from and coaxially with the face 26 of bearing member 20. Stem 24 extends through an aperture 28 of a second block 30 and is inserted within a handle 32, as best shown in FIG. 2. The frusto-conical seat 34 is formed within one side of block 30 and is substantially coaxial with aperture 28. The frusto-conical seat 34 and frusto-conical bearing member 20 comprise the means for binding blocks 12, 30. Alternately, other means for binding blocks 12, 30 could be provided. For example, bearing member 20 and seat 34 could be cylindrical with one of them having external ribs and the other having corresponding channels that interlock when blocks 12, 30 are drawn together. Such ribs and channels may alternatively be provided on the preferred embodiment if desired.

Block 30 also includes a second slot 36 that extends from one face of block 30 to a second cylindrical passageway 38 within block 30. Passageway 38 could be other shapes if necessary. Slot 36 and passageway 38 extend completely through block 30, but could alternatively extend only partially through the block. A second rod 40 is inserted through passageway 38 so that second rod 40 is substantially perpendicular to aperture 28. Means for compressing slot 36 to secure rod 40 within passageway 38 includes handle 32 and stem 24.

Also, referring to FIG. 1, the means for securing the first rod 18 within first passageway 16 and the second rod 40 within the second passageway 38 includes handle 32, stem 24, first slot 14, and second slot 36. When handle 32 is tightened, stem 24 is drawn within handle 32 a sufficient distance to compress slots 14, 16 so that the first rod 18 and second rod 40 are grasped securely within the first and second passageways 16, 18. Loosening of handle 32 allows the slots 14, 36 to expand sufficiently so that the first and second rods 18, 40 may be moved within the first and second passageways 16, 38.

Preferably, handle 32 is substantially L-shaped and includes an internally threaded portion 42 that cooperates with stem 24 to tighten and loosen the support assembly 10. Handle 32 could alternatively be other suitable shapes such as a knob or T-bar. A set screw 44 is insertable within an internally threaded aperture 46 of handle 32. As best shown in FIG. 2, set screw 44 may be tightened against the nonthreaded portion 48 of stem 24 to secure the support assembly 10 in a desired position. A washer 50 is placed on stem 24 to help retain handle 32 in a tightened position.

Figure 3:
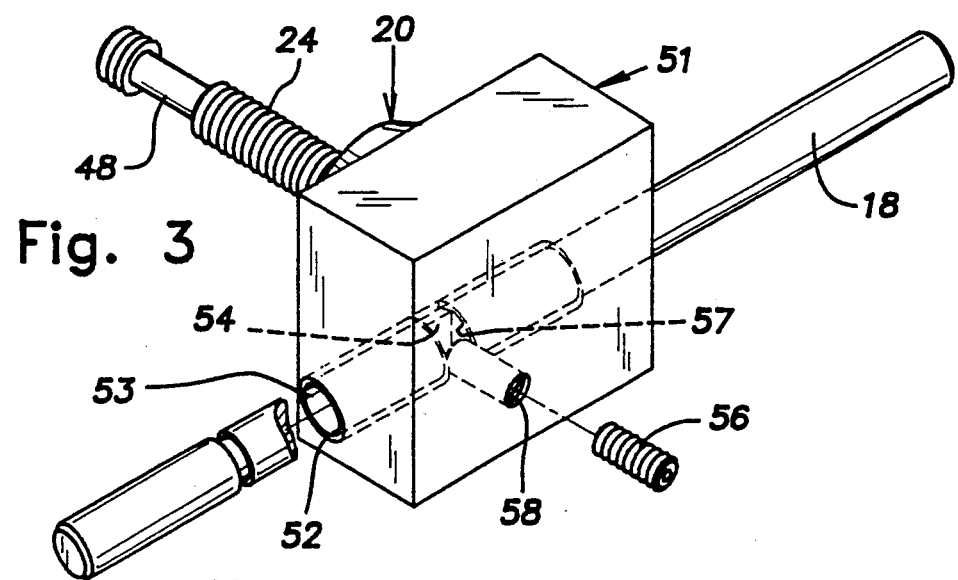
FIG. 3 is a second embodiment of the first block of FIG. 1.

FIG. 3 depicts a second embodiment including first block 51 that eliminates first slot 14. A preferably bronze bushing 52 is inserted within a first passageway 53 that comprises the means for retaining the first support rod 18 within the first block 51. First support rod 18 includes a flat portion 54 and is placed within bushing 52. A set screw 56 is adjustably inserted within a threaded aperture 58 and comprises the means for securing the first support rod 18 within block 51. The set screw 56 interacts with the flat portion 54 to limit or prevent rotation of rod 18 about its longitudinal axis. Bushing 52 includes a slot 57 through which set screw 56 passes.

Set screw 56 is in its engaged position when advanced against the flat portion 54 so that rod 18 is unable to rotate. Set screw 56 is in its disengaged position when it is withdrawn away from the flat portion 54 so that rod 18 may oscillate about its longitudinal axis between a first position and a second position. The first position is the position of rod 18 when the flat portion 54 engages set screw 56 when rod 18 is rotated in one direction. The second position is the position of rod 18 when the flat portion 54 engages set screw 56 when rod 18 is rotated in the other direction. The range of rotation is limited by the distance set screw 56 is from the flat portion 54.

Figure 4:
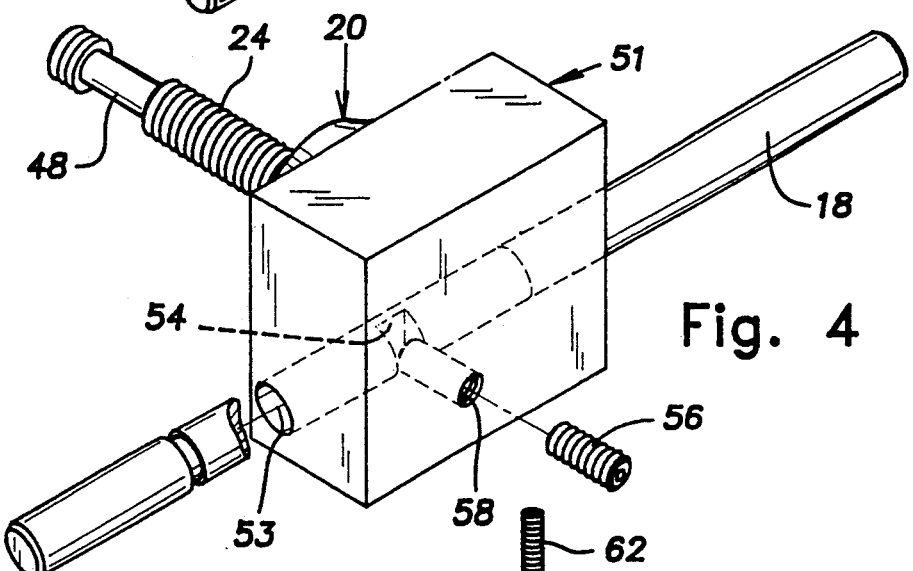
FIG. 4 is a third embodiment of the first block of FIG. 1.

A third embodiment is shown in FIG. 4 wherein first block 51 excludes bushing 52. This embodiment is identical to the embodiment of FIG. 3 except that the bushing 52 is not present. The absence of bushing 52 inhibits rotation of rod 18 within passageway 16. Thus, the embodiment of FIG. 4 is utilized when the rotation of rod 18 is to be prevented. This is accomplished by tightening set screw 56 against the flat portion 54.

Figure 5:
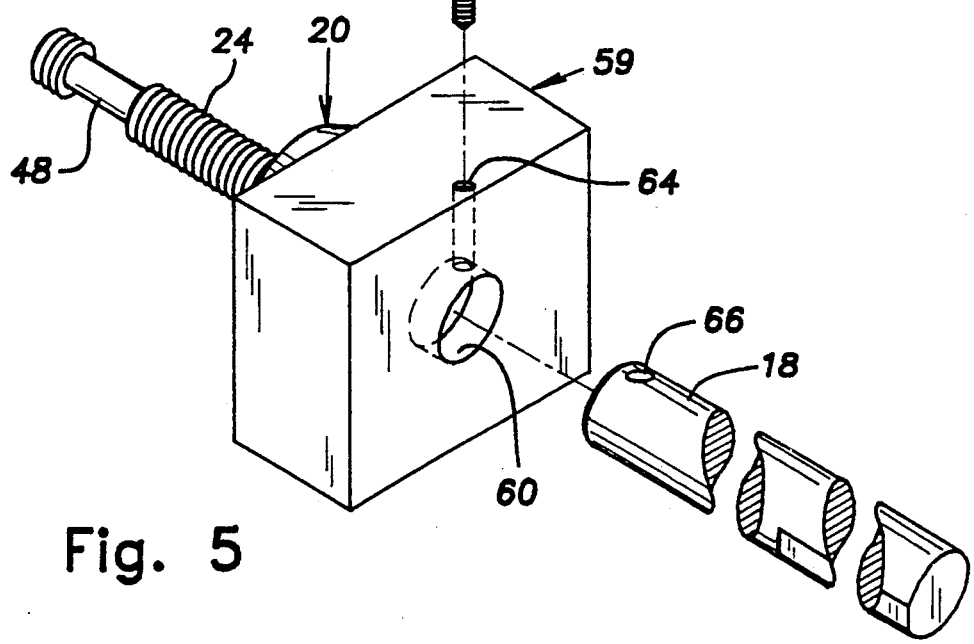
FIG. 5 is a fourth embodiment of the first block of FIG. 1.

FIG. 5 shows a fourth embodiment that includes a first block 59. This embodiment is used when it is desirable to fix first block 59 relative to another construction, and only allow second block 30 and rod 40 to be moveable. The means for retaining the rod 18 within the first block 59 comprises a recess 60 formed in one face of block 59. Recess 60 is adapted to receive one end of first support rod 18. Set screw 62 is adjustably inserted within a internally threaded aperture 64 that leads to recess 60. Set screw 62 comprises the means for securing rod 18 within first block 59.

One end of rod 18 includes an indentation 66 for receiving one end of set screw 62 when tightened. When one end of rod 18 is inserted within recess 60 and set screw 62 is tightened, one end of set screw 62 engages indentation 66 to secure rod 18 in a fixed position within recess 60. When set screw 62 is withdrawn from indentation 66 the support assembly 10 may be removed from rod 18.

While the preferred embodiments of the present invention are shown and described herein, it is to be understood that the same is not so limited but shall cover and include any and all modifications thereof which fall within the purview of the invention.

What I claim is:

1. An adjustable support assembly, comprising:
    a first block;
    means for retaining a first support rod within said first block;
    a second block;
    means for retaining a second support rod within said second block;
    means for securing the first support rod within said first block and the second support rod within said second block, said securing means being adjustable between a tightened position and a loosened position; and
    means for rotationally binding said first block with said second block when said securing means is in said tightened or loosened position so that the relative rotation of said first and second blocks is prevented, the means for rotationally binding comprising a substantially smooth bearing member on one of said first block and said second block, and a substantially smooth seat on the other of said blocks, the seat adapted to receive the bearing member when the first and second blocks are joined.

2. An adjustable support assembly as recited in claim 1, wherein:
    said means for retaining a second support rod within said second block includes a first passageway through said second block;
    said means for retaining a first support rod within said first block includes a second passageway through said first block;
    said securing means comprises:
        a partially threaded stem extending from one face of said first or second block through an aperture of said other block;
        a handle having an internally threaded portion for receiving said threaded stem;
        a first slot extending from one face of said second block to said first passageway; and
        a second slot extending from one face of said first block to said second passageway, wherein when said handle is tightened said first and second slots are compressed so that the first and second support rods are secured within said first and second passageways, and when said handle is loosened the first and second slots expand so that the first and second support rods are moveable within said first and second passageways.

3. An adjustable support assembly as recited in claim 1, wherein said means for rotationally binding said first block with said second block comprises:
    a frusto-conical bearing member attached to said first block; and
    a frusto-conical seat attached to said second block, said frusto-conical seat adapted to receive said frusto-conical bearing member when said first and second blocks are adjoined so that relative rotation of the first and second blocks is prevented when the securing means is in a loosened position.

4. An adjustable support assembly as recited in claim 3, wherein said frusto-conical seat and said frusto-conical bearing member are each tapered between about 11.5° and 12.5°.

5. An adjustable support assembly as recited in claim 3, wherein said frusto-conical seat is coaxial with said aperture of said second block, and said frusto-conical bearing member is coaxial with said stem.

6. An adjustable support assembly as recited in claim 3, wherein said means for retaining a first support rod comprises a second passageway through said first block.

7. An adjustable support assembly as recited in claim 6, wherein said means for securing the first support rod within said first block comprises a second slot extending from one face of said first block to said second passageway so that when said second slot is sufficiently compressed the first rod is secured within said second passageway.

8. An adjustable support assembly, comprising:
    a first block having means for retaining a first support rod, and means for securing the first support rod within said first block;
    a second block having means for retaining a second support rod, and means for securing the second support rod within said second block; wherein
    said means for securing the first support rod within said first block and said means for securing said second support rod within said second block are independently operable so that one of the first or second support rods may be maintained in a secured position while the other of the rods is being adjusted, and a substantially smooth bearing member on one of said first block or said second block;

a substantially smooth seat on the other of said blocks, the seat adapted to receive the bearing member when the first and second blocks are joined.

9. An adjustable support assembly as recited in claim 8, wherein:

said means for retaining a second support rod within said second block comprises a first passageway through said second block;

said means for securing the second support rod within said second block comprises a first slot extending from one face of said second block to said first passageway, and means for compressing said first slot so that the second support rod is secured within said first passageway.

10. An adjustable support assembly as recited in claim 9, wherein said means for compressing said first slot comprises:

a partially threaded stem extending from one face of said first block;

an aperture within said second block through which said stem passes; and a handle having an internally threaded portion for receiving said stem, when said handle is turned in one direction said first and second blocks are drawn together thereby compressing said first slot, said handle moveable between a tightened position and a loosened position.

11. An adjustable support assembly as recited in claim 9, wherein said means for retaining a first support rod within said first block comprises a second passageway through first block.

12. An adjustable support assembly as recited in claim 11, wherein said means for retaining a first support rod within said first block further comprises a bushing within said second passageway.

13. An adjustable support assembly as recited in claim 11, wherein said means for securing the first support rod within said first block comprises:

a first set screw adjustably inserted within a tapped aperture in said first block, said first set screw being moveable between an engaged position and a disengaged position.

14. An adjustable support assembly as recited in claim 13, wherein when said first set screw is in said disengaged position the first rod may be oscillated about its longitudinal axis through about 120°.

15. An adjustable support assembly as recited in claim 9, wherein said means for retaining a first support rod within said first block comprises a recess extending partially within said first block within which one end of the first rod is inserted.

16. An adjustable support assembly as recited in claim 15, wherein said means for securing the first support rod within said first block comprises;

a set screw adjustably inserted within a tapped aperture of said first block, one end of said set screw being engageable with the first rod contained within said recess to secure the first rod therein.

17. An adjustable support assembly as recited in claim 9, further comprising:

means for binding said first block with said second block when said handle is in said tightened position so that the relative rotation of said first and second blocks is prevented.

18. An adjustable support assembly as recited in claim 17, wherein said means for rotationally binding said first block with said second block comprises:

a frusto-conical bearing member integral with said first block;

a frusto-conical seat integral with said second block, said frusto-conical seat adapted to receive said frusto-conical bearing member when said first and second blocks are adjoined.

19. An adjustable support assembly as recited in claim 18, wherein said frusto-conical seat and said frusto-conical bearing member are each tapered between about 11.5° and 12.5°.

* * * * *